(12) United States Patent (10) Patent No.: US 7,355,839 B2
Yoneda et al. (45) Date of Patent: Apr. 8, 2008

(54) ELECTRODE FOR AN ELECTROCHEMICAL CAPACITOR, A COMPOSITION USED FOR THE ELECTRODE, A METHOD OF MANUFACTURING THE ELECTRODE, AND AN ELECTROCHEMICAL CAPACITOR USING THE ELECTRODE

(75) Inventors: Yoshinori Yoneda, Gunma (JP); Michihiro Sugou, Gunma (JP); Yoshinori Ogawa, Tokyo (JP)

(73) Assignee: Shin-Etsu Chemical Co., Ltd., Chiyoda-ku, Tokyo (JP)

( * ) Notice: Subject to any disclaimer, the term of this patent is extended or adjusted under 35 U.S.C. 154(b) by 101 days.

(21) Appl. No.: 11/429,054

(22) Filed: May 8, 2006

(65) Prior Publication Data

US 2006/0250750 A1 Nov. 9, 2006

(30) Foreign Application Priority Data

May 9, 2005 (JP) ............................. 2005-135809

(51) Int. Cl.
*H01G 9/00* (2006.01)
(52) U.S. Cl. ...................... 361/503; 361/502; 29/25.03
(58) Field of Classification Search ........ 361/502–503, 361/508, 528; 29/25.03; 428/418, 458
See application file for complete search history.

(56) References Cited

U.S. PATENT DOCUMENTS

| 6,375,688 | B1 * | 4/2002 | Akami et al. | ............... 29/25.03 |
| 2001/0017758 | A1 * | 8/2001 | Saito et al. | ................. 361/524 |
| 2003/0040578 | A1 * | 2/2003 | Sugo et al. | ................. 525/100 |

* cited by examiner

*Primary Examiner*—Eric Thomas
(74) *Attorney, Agent, or Firm*—Millen, White, Zelano & Branigan, P.C.

(57) ABSTRACT

An electrode for an electrochemical capacitor which contains an electrode, a collector, an electrolyte solution and a separator, wherein the electrode contains at least a conductive material and a polyimide silicone of formula (1)

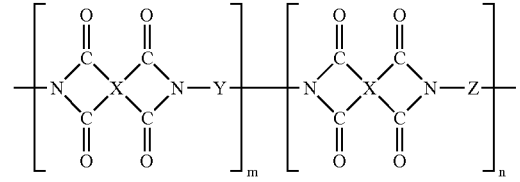

having an average molecular weight of 5,000-150,000.

20 Claims, No Drawings

US 7,355,839 B2

ELECTRODE FOR AN ELECTROCHEMICAL CAPACITOR, A COMPOSITION USED FOR THE ELECTRODE, A METHOD OF MANUFACTURING THE ELECTRODE, AND AN ELECTROCHEMICAL CAPACITOR USING THE ELECTRODE

FIELD OF THE INVENTION

The present invention relates to an electrode for an electrochemical capacitor and a method of manufacturing this electrode. In particular, it relates to an electrode having heat resistance and electrolyte resistance using a special binder having superior adhesive properties, a method of manufacturing same, to a composition used for this electrode, and to an electrochemical capacitor using this electrode.

BACKGROUND OF THE INVENTION

Electrochemical capacitors, such as electric double layer capacitors, redox capacitors and hybrid capacitors, are long-life compared with secondary batteries, and have superior high cycle characteristics and instantaneous charge/discharge characteristics, consequently demand for electric double layer capacitors has rapidly been increasing in recent years for memory backup power supplies. This type of electrochemical capacitor is also attracting attention for uses such as auxiliary power supplies in vehicle batteries and motors, and development of high capacity electrochemical capacitors is under way.

In one example of this type of electrochemical capacitor, separators are interposed between polarizable electrodes formed on a pair of collectors, this construction being laminated or wound, impregnated with an electrolyte solution and housed in a case. The electrodes are formed from thin sheets of material obtained by mixing a carbon powder such as active carbon with a binder such as polytetrafluoroethylene.

It is known that, since an electric double layer is produced at the interface between the electrolyte solution and conductive material, the capacity of the capacitor becomes larger, the larger the surface area of the conductive material is. For this reason, the pores in the conductive material are made smaller to increase the surface area of the conductive material, and the capacitance of the capacitor increases, the larger the surface area is. However, there is a disadvantage that if the pores are made small, the mobility of the electrolyte solution decreases, and the internal resistance of the capacitor also increases. It is thus very difficult to manufacture an electric double layer capacitor which not only has low internal resistance, but also has large capacity.

To increase the capacity of electric double layer capacitors, or from the viewpoint of reducing internal resistance, various improvements in conductive materials have been reported. For example, a redox type capacitor wherein the conductive material itself stores electricity by an oxidation-reduction reaction, and a hybrid capacitor which uses a Faraday reaction at one electrode, have been proposed (Nonpatent document 1).

[Nonpatent document 1] "High capacity capacitor techniques and materials", II—"Latest trends in electric double layer capacitors and super capacitors", CMC Co., Ltd., January 2003"

On the other hand, the binder which is the other component of the electrode must be a material which has resistance to electrolyte solutions, electrochemical stability and heat resistance, and resins such as polytetrafluoroethylene and polyvinylidene fluoride are specifically used for this purpose.

If the amount of binder used is increased, there is the disadvantage that the internal resistance of the electrode increases, so in order to reduce internal resistance, it is desirable to reduce the amount of binder used. On the other hand, if the amount of binder used is reduced, adhesion between the electrode and the collector becomes poorer, which again leads to an increase of internal resistance.

Recently, a polyimide silicone resin composition has been proposed as a binder composition offering good adhesion between electrodes and collectors, and has superior heat-resistance and chemical resistance (Patent document 1). However, when this composition was used as a binder, although it had chemical resistance, it swelled up when immersed in an electrolyte solution.

[Patent document 1] Japanese Unexamined Patent Application Laid-Open (JP-A) No. 2002-289196

A polyimide resin and polyamidoimide resin have also been proposed as the binder for the adhesive layer which sticks the electrode and collector together (Patent document 2). However, although these resins have high heat resistance and chemical resistance, they have poor adhesion to metals and organic resins such as polytetrafluoroethylene.

[Patent document 2] JP-A No. 2004-48055

SUMMARY OF THE INVENTION

It is therefore a first object of the present invention to provide an electrode for an electrochemical capacitor having superior heat resistance and electrolyte resistance, and which sticks firmly to the collector.

It is a second object of the present invention to provide a composition used for an electrode for an electrochemical capacitor for firmly sticking an electrode having superior heat resistance and electrolyte resistance, to a collector.

It is a third object of the present invention to provide a method of manufacturing an electrode for an electrochemical capacitor having superior heat resistance and electrolyte resistance.

It is a fourth object of the present invention to provide an electrochemical capacitor having superior heat resistance and electrolyte resistance, together with high capacity and high stability.

The Inventors, as a result of intensive efforts intended to achieve the above objects, discovered that by forming an electrode having a conductive material and a binder containing a specific polyimide silicone, an electrode for an electrochemical capacitor having superior adhesion to a collector, together with superior heat resistance and electrolyte resistance, could be obtained, and that by combining this electrode for an electrochemical capacitor with a collector, an electrolyte solution and a separator, a stable electrochemical capacitor of high capacity could be obtained. They thereby arrived at the present invention.

The present invention is therefore an electrode for an electrochemical capacitor comprising an electrode, a collector, an electrolyte solution and a separator, wherein said electrode contains at least a conductive material and a polyimide silicone expressed by the following general formula (1) having an average molecular weight of 5,000-150,000:

(1):

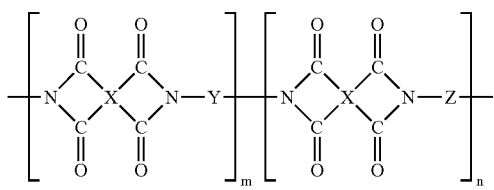

wherein, X is at least one moiety selected from among tetravalent organic groups expressed by the following formulae (2)-(7), Y is an organic group having an ether linkage expressed by one of the following formula (8) and (9), and Z is a siloxane diamine residue expressed by the following general formula (15), wherein the proportion of the siloxane diamine residue expressed by said general formula (15) in the polyimide silicone expressed by the general formula (1) is 10 mass % or less.

(2)

(3)

(4)

(5)

(6)

(7)

(8)

(9)

wherein, B in the aforesaid formula (8) is a divalent organic group expressed by one of the following formulae (10)-(14)

(10)

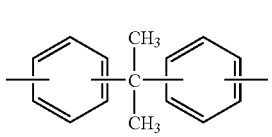

(11)

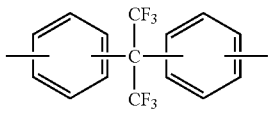

(12)

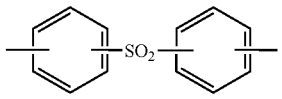

(13)

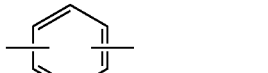

(14)

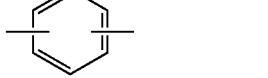

(15):

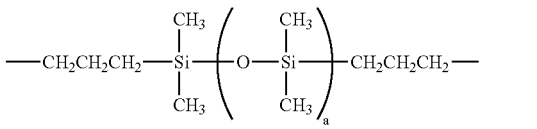

wherein, "a" in the aforesaid formula (15) is an integer from 1-20;

and "m", "n" in the general formula (1) are numbers satisfying the relations $0.8 \leq m/(m+n) \leq 0.99$ and $0.01 \leq n/(m+n) \leq 0.2$.

Since the electrode of the present invention firmly sticks to a collector and excels in heat resistance and electrolyte resistance, an extremely stable electrochemical capacitor of high capacity can be obtained by combining it with a collector, an electrolyte solution and a separator.

DETAILED DESCRIPTION OF THE INVENTION

First, the electrode for an electrochemical capacitor according to the invention will be described.

The electrode for an electrochemical capacitor of the present invention contains at least a conductive material and a polyimide silicone having an average molecular weight of 5,000 to 150,000, this polyimide silicone having the general formula (1) below. Specifically, this polyimide silicone functions as a binder and sticks the electrode to the collector. If its average molecular weight is less than 5,000, the hardness of the electrode is not sufficient, whereas if it exceeds 150,000, the workability when the polyimide silicone or the electrode is manufactured, is adversely affected.

General formula (1):

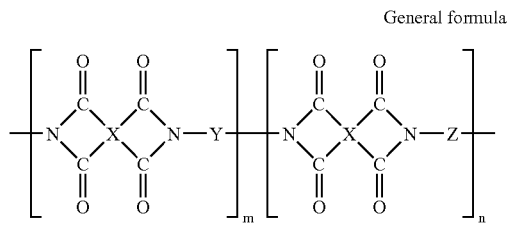

In the general formula (1), X is at least one group selected from among tetravalent organic groups expressed by the following formulae (2)-(7). In the polyimide silicone used in the present invention, X may comprise only one moiety, or may comprise two or more moieties.

(2)

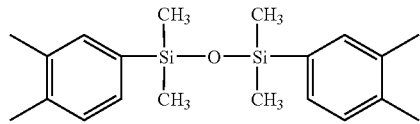

(3)

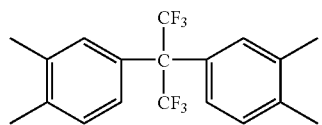

(4)

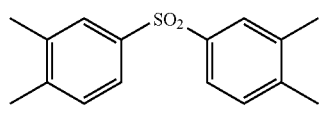

(5)

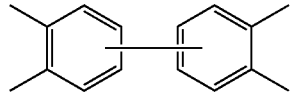

(6)

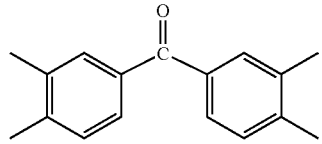

(7)

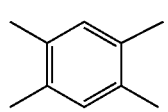

In the aforesaid general formula (1), Y is an organic group having an ether linkage expressed by one of the following formulae (8) and (9). In the polyimide silicone used in the present invention, Y may comprise only one moiety, or may comprise two or more moieties.

(8)

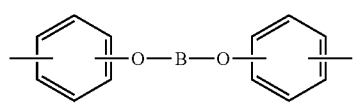

-continued (9)

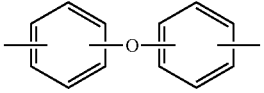

In the aforesaid formula (8), B is a divalent organic group expressed by one of the following formulae (10)-(14). In the polyimide silicone used in the present invention, B may comprise only one moiety, or may comprise two or more moieties.

(10)

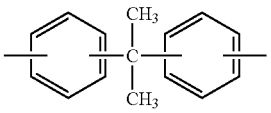

(11)

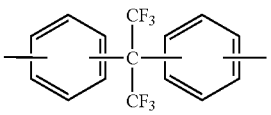

(12)

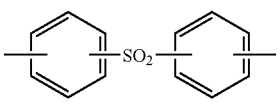

(13)

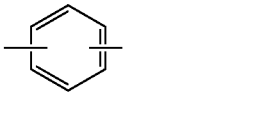

(14)

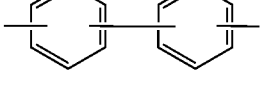

In the aforesaid general formula (1), Z is a siloxane diamine residue expressed by the following general formula (15):

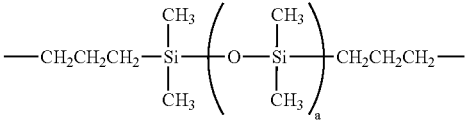

In the aforesaid formula (15), the moiety inside the brackets is a siloxane repeating unit, "a" being the number of repetitions. "a" must be an integer from 1-20, and is preferably an integer from 1-10. If "a" exceeds 20, adhesion to the collector decreases.

The proportion of the siloxane diamine residue expressed by the general formula (15) in the polyimide silicone expressed by the general formula (1) must be 10 mass % or less. If it exceeds 10 mass %, the material does not have good electrolyte resistance and good adhesion to the collector.

"m", "n" in the general formula (1) must satisfy the following relations:

$0.8 \leq m/(m+n) < 0.99$ $0.01 \leq n/(m+n) \leq 0.2$

More preferably, they satisfy:

$$0.9 \leq m/(m+n) \leq 0.99$$

$$0.01 \leq n/(m+n) \leq 0.1$$

If the value of n/(m+n) is less than 0.01, adhesion to the collector is poorer, and if it is more than 0.2, the material does not have good electrolyte resistance.

In addition, in the electrode for an electrochemical capacitor of the present invention, the polyimide silicone may contain another polyimide repeating unit other than the aforesaid unit. In this case, the aforesaid relations must still be satisfied.

A conductive material is mixed with the polyimide silicone to form the electrode for an electrochemical capacitor. The conductive material, from the viewpoint of increasing the surface area of the electrode and enhancing the charge storage capacity of the capacitor, is preferably a carbon material or a transition metal composite oxide. Examples of a carbon material are an activated carbon of high specific surface obtained by activation treatment of a easy graphitizing carbon such as spherical or fibrous artificial graphite and coke, or a not easy graphitizing carbon such as a phenolic resin sintered body, with an alkali metal hydroxide or steam. Examples of a transition metal composite oxide. are $MnO_2$, $V_2O_5$, $LiCoO_2$ and $LiNiO_2$, and a conductance imparting agent such as acetylene black or graphite may be further mixed therewith if required.

The mass ratio of conductive material to polyimide silicone is preferably 99:1-80:20, but more preferably 99:1-85:15. If the ratio of polyimide silicone is more than 20, the internal resistance of the electrochemical capacitor increases, and if the ratio of polyimide silicone is less than 1, adhesion to the collector is poorer.

Next, the composition used for the electrode for an electrochemical capacitor of the invention will be described. The polyimide silicone used for the electrode for an electrochemical capacitor of the present invention is insoluble in solvents, so an electrode which is cured beforehand cannot be made to adhere to the collector.

Therefore, when the electrode for an electrochemical capacitor of the present invention is manufactured, a composition which is a mixture of a conductive material and a polyamic acid which is a precursor of the polyimide silicone, is used. This composition is applied to the collector, heat treatment is then performed to cure the composition and stick it to the collector, and the electrode for an electrochemical capacitor of the present invention is thereby obtained.

The polyamic acid which is a precursor of the polyimide silicone used in the present invention is expressed by the following general formula (16):

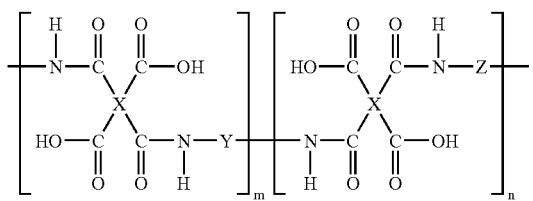

(16)

X, Y, Z, m, n in the aforesaid formula (16) are identical to those in the general formula (1) mentioned above.

The polyamic acid used in this invention may be synthesized by a method known in the art. Specifically, the polyamic acid can be easily synthesized by dissolving a tetracarboxylic acid dianhydride component, an aromatic diamine and a diaminosiloxane in a solvent such as N-methyl-2-pyrrolidone, and reacting them at approximately 0-50° C.

The proportion of diamine component relative to the tetracarboxylic acid dianhydride component is determined from the viewpoint of adjusting the molecular weight of the target polyimide silicone resin. This is normally 0.95-1.05, but preferably 0.98-1.02, in terms of molar ratio.

The composition used for the electrode for an electrochemical capacitor of the present invention may be obtained by mixing the resulting polyamic acid solution with a conductive material. The conductive material is as described above. The mixing ratio of conductive material and polyamic acid is preferably 99:1-80:20, but more preferably 99:1-85:15. If the ratio of polyamic acid is more than 20, the internal resistance of the electrochemical capacitor increases, and if the ratio of polyamic acid is less than 1, adhesion to the collector is poorer. In order to adjust the molecular weight of polyimide silicone resin after heat treatment, raw materials containing functional groups such as phthalic anhydride and aniline, can also be added. In this case, the addition amount is preferably 5 mol % or less relative to the desired amount of polyimide silicone resin.

Next, the method of manufacturing the electrode for an electrochemical capacitor of the present invention will be described. The method of manufacturing the electrode for an electrochemical capacitor comprises a step for applying the composition used for the electrode to a collector surface, followed by a heat treatment step for curing the aforesaid polyamic acid and sticking the electrode to the collector. The collector may be selected from among materials known in the art, such as a mesh metal, punching metal or foil of aluminum, copper, nickel or stainless steel.

When applying the composition used for an electrode for an electrochemical capacitors to the collector, the mixture may be diluted with a solvent, or a thickener may be added to thicken it if required. After applying, the acid amide part and the carboxyl group of the polyamic acid are made to undergo a dehydration imidization by heat treatment to form the polyimide silicone. Due to this reaction, when the composition of the aforesaid mixture cured to form the electrode and is firmly stuck to the collector, faulty contact between the electrode and collector can be suppressed.

The temperature range for the heat treatment is normally 200° C.-600° C., but preferably 250° C.-500° C. If it is less than 200° C., the imidization becomes difficult which is undesirable. If it is more than 600° C., the polyimide silicone resin undergoes pyrolysis, which is also undesirable.

Next, the electrochemical capacitor of this invention will be described.

The electrochemical capacitor of the present invention is comprised of a collector, an electrolyte solution, a separator, and an electrode of the electrochemical capacitor of the present invention. As described hereinabove, in the present invention, the electrode for an electrochemical capacitor is provided as the electrode which is firmly stuck to the collector.

The separator can be selected from among those known in the art, but it is preferred to use a fine porous membrane of polyethylene, polypropylene or polyester.

The electrolyte solution can be selected from among those known in the art. For example, a solution containing 0.5 mol/liter-5 mol/liter of an electrolyte, e.g., ammonium tetrafluoroborates such as tetraethylammonium tetrafluoroborate, tetramethyl ammonium tetrafluoroborate or tetrapropyl ammonium tetrafluoroborate, ammonium perchlorates such as tetraethylammonium perchlorate, or ammonium hexafluorophosphates such as tetraethylammonium hexafluorophosphate, dissolved in one, two or more organic solvents selected from among a carbonates such as ethylene carbonate, propylene carbonate, butylene carbonate, dimethyl carbonate, ethyl methyl carbonate or diethyl carbonate, sulfolanes such as sulfolane, or lactones such as gamma-butyrolactone, may be used. Alternatively, an ionic liquid which is a fused salt at ordinary temperature comprising an organic cation such as imidazolium ion and pyridinium ion with an anion such as $BF_4^-$ and $CF_3SO_3^-$, may be used.

The electrochemical capacitor of this invention can be given a form known in the art. For example, separators may be interposed between electrodes of polyimide silicone and conductive material formed on a pair of collectors, this construction being laminated or wound, impregnated with an electrolyte solution and housed in a case.

Hereafter, this invention will be described in further detail with examples, although the present invention is by no means limitation to these examples.

EXAMPLES

Names of substances used in the synthetic examples, examples and comparative example are abbreviated as follows. In the following examples, "parts" means "mass parts."

3,3',4,4'-benzophenone tetracarboxylic acid dianhydride: BTDA 3,3',4,4'-diphenylsulfone tetracarboxylic acid dianhydride: DSDA 4,4'-diaminophenylether: DPE 1,3-bis(3-aminophenoxy)benzene: APB 2,2-bis[4-(4-aminophenoxy)phenyl]propane: BAPP 3,3'-dihydroxy-4,4'-diaminobiphenyl: HAB N,N-diglycidyl-4-glycidyloxyaniline: GGA Synthesis Example 1

(Synthesis of Polyamic Acid Solution (I))

In a flask with a stirrer, thermometer, and nitrogen purge equipment, 96.6 g (0.30 mol) of BTDA and 300 g of N-methyl-2-pyrrolidone were placed. Then, a solution prepared by dissolving 54.0 g (0.27 mol) of DPE and 7.5 g (a=1, 0.03 mol) of diaminosiloxane represented by the following general formula (17) in 174.3 g of N-methyl-2-pyrrolidone, was added dropwise into the flask while the temperature of the reaction system was so controlled as under 50° C. After the addition was completed, the reaction mixture was stirred at room temperature for 10 hours and 25 mass % solution of polyamic acid resin was thus obtained. The mass average molecular weight (expressed as polystyrene) of this resin measured by gel permeation chromatography (GPC) using tetrahydrofuran as solvent, was 17,000. This resin solution (siloxane fraction of the resin was 4.1 mass %) was taken as "polyamic acid solution (I)", and used for the examples.

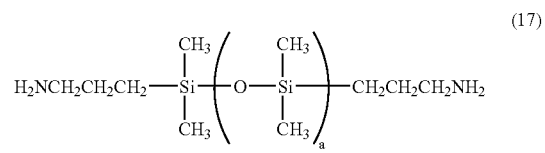

(17)

Synthesis Example 2

(Synthesis of Polyamic Acid Solution (II))

In a flask provided with a stirrer, thermometer and nitrogen purge equipment, 96.6 g (0.30 mol) of BTDA and 300 g of N-methyl-2-pyrrolidone were placed. Then, a solution prepared by dissolving 78.8 g (0.27 mol) of APB and 7.5 g (a =1, 0.03 mol) of diaminosiloxane represented by the aforesaid general formula (17) in 248.7 g of N-methyl-2-pyrrolidone, was added dropwise into the flask while the temperature of the reaction system was so controlled as under 50° C. After the addition was completed, the reaction mixture was stirred at room temperature for 10 hours and a 25 mass % solution of polyamic acid resin was thus obtained. The mass average molecular weight (expressed as polystyrene) of this resin measured by gel permeation chromatography (GPC) using tetrahydrofuran as solvent, was 19,000. This resin solution (siloxane fraction of the resin was 3.6 mass %) was taken as "polyamic acid solution (II)", and used for the examples.

Synthesis Example 3

(Synthesis of Polyamic Acid Solution (III))

In a flask provided with a stirrer, thermometer and nitrogen purge equipment, 96.6 g (0.30 mol) of BTDA and 300 g of N-methyl-2-pyrrolidone were placed. Then, a solution prepared by dissolving 110.9 g (0.27 mol) of BAPP and 7.5 g (a=1, 0.03 mol) of diaminosiloxane represented by the aforesaid general formula (17) in 345 g of N-methyl-2-pyrrolidone, was added dropwise into the flask while the temperature of the reaction system was so controlled as under 50° C. After the addition was completed, the mixture was stirred at room temperature for 10 hours and a 25 mass % solution of polyamic acid resin was thus obtained. The mass average molecular weight (expressed as polystyrene) of this resin measured by gel permeation chromatography (GPC) using tetrahydrofuran as solvent, was 23,000. This resin solution (siloxane fraction of the resin was 3.0 mass %) was taken as "polyamic acid solution (III)", and used for the embodiments.

Synthesis Example 4

(Synthesis of Polyamic Acid Solution (IV))

In a flask provided with a stirrer, thermometer and nitrogen purge equipment, 96.6 g (0.30 mol) of BTDA and 300 g of N-methyl-2-pyrrolidone were placed. Then, a solution prepared by 57.0 g (0.285 mol) of DPE and 45.9 g (average of a=39, 0.015 mol) of diaminosiloxane represented by the aforesaid general formula (17) in 298.5 g of N-methyl-2-pyrrolidone, was added dropwise into the flask while the temperature of the. reaction system was so controlled as under 50° C. After the addition was completed, the mixture was stirred at room temperature for 10 hours, and a 25 mass % solution of polyamic acid resin was thus obtained. The mass average molecular weight (expressed as polystyrene) of this resin measured by gel permeation chromatography (GPC) using tetrahydrofuran as solvent, was 36,000. This resin solution (siloxane fraction of the resin was 22.8 mass %) was taken as "polyamic acid solution (IV)", and used for the comparative examples.

Synthesis Example 5

(Synthesis of Polyamic Acid Solution (V))

In a flask provided with a stirrer, thermometer and nitrogen purge equipment, 107.4 g (0.30 mol) of DSDA and 400 g of cyclohexanone were placed. Then, a solution prepared by dissolving 51.6 g (average of a=9.3, 0.06 mol) of diaminosiloxane represented by the aforesaid general formula (17), 32.7 g (0.15 mol) of HAB and 36.9 g (0.09 mol) of BAPP in 100 g of cyclohexanone, was added dropwise into the flask, while the temperature of the reaction system was so controlled as under 50° C. After the addition was completed, the mixture was stirred at room temperature for 10 hours.

Then, a reflux condenser with a water receptor was attached to the flask, and 60 g of toluene was added. The reaction mixture was heated to 150° C. and kept at that temperature 6 hours, and a brown solution was thus obtained. This was poured into methanol for reprecipitation, the reprecipitated solids were removed dried, and a brown resin was thus obtained. The infrared absorption spectrum of the obtained resin was measured. An absorption due to polyamic acid which indicates unreacted functional groups did not appear, but absorptions due to imido groups were found at 1780 $cm^{-1}$ and 1720 $cm^{-1}$. The mass average molecular weight (expressed as polystyrene) of this resin measured by gel permeation chromatography (GPC) using tetrahydrofuran as solvent, was 15,000. The phenol equivalent was 762 g/mol.

This resin solution (siloxane fraction of the resin was 22.3 mass %) was taken as "polyimide silicone (V)", and used for the Comparative Examples.

Example 1

95 parts of activated carbon powder (specific surface area of 1700 $m^2/g$, average particle size of 10 μm) used as a conductive material was kneaded with 20 parts of 25 mass % polyamic acid solution (I) obtained in Synthesis Example 1 used as the binder component, and obtained a composition for a capacitor electrode wherein the mass ratio of polyamic acid to activated carbon was 1:19.

As the collector, aluminum foil of thickness of 0.1 mm which had been subjected to etching treatment, was used. The composition for capacitor electrode was applied to the surface, heated at 150° C. for 30 minutes, cured at 300° C. for 1 hour by heat treatment, and a sheet-like test piece wherein the electrode was stuck to the aluminum foil collector, was thus manufactured.

The heat resistant adhesion and electrolyte resistance of the obtained test piece were examined by the following methods. The results are shown in TABLE 2.

[Heat Resistant Adhesion]

The initial adhesion and the flexion compliance adhesion after 240° C. for 240 hours were measured by the following methods.

After bending using a mandrel (2 mm φ), peeling from the aluminum foil film and cracks appearing in the film were observed.

[Electrolyte Resistance]

Electrolyte resistance was evaluated by immersing the test piece in propylene carbonate solution containing 1 mol/l of tetraethylammonium tetrafluoroborate at 60° C. for 96 hours, and measuring the increase rate of the mass of the test piece due to absorption of solution.

[Performance Test of Electrochemical Capacitor]

A circular test piece of diameter of 15 mm was impregnated with propylene carbonate solution containing 1 mol/l tetraethylammonium tetrafluoroborate as electrolyte solution, and separators comprising a nonwoven fabric of polypropylene fiber were sandwiched between electrodes on either side to form an electrochemical capacitor.

The initial discharge capacity and the internal resistance of the obtained electrochemical capacitor were measured, and the discharge capacity and internal resistance after 500 cycles of the capacitor in a thermostat at 60° C. were measured, taking one charge and discharge at a constant current of 3 $mA/cm^2$ between 0-2.8V as 1 cycle. An accelerated test of long-term use of the electrochemical capacitor was performed by observing the performance change before and after this use, and the stability was thus evaluated.

Examples 2 and 3

Test pieces were produced as in Example 1 except using polyamic acid solution (II) or (III) instead of polyamic acid solution (I), and their properties were evaluated.

Comparative Example 1

95 parts of activated carbon powder (specific surface area of 1700 $m^2/g$, average particle size of 10 μm) was kneaded with 5 parts of polytetrafluoroethylene (average particle size of 500 μm) as binder component together with the addition of 30 parts of ethanol, and a mixture was obtained wherein the mass ratio of polyamic acid to activated carbon was 1:19. This mixture was applied to aluminum foil (thickness of 0.1 mm), and heat treatment was performed at 100° C. for 1 hour to manufacture a test piece. Using the obtained test piece, the properties were evaluated as in Example 1.

Comparative Example 2

95 parts activated carbon powder (specific surface area of 1700 $m^2/g$, average particle size of 10 μm) was kneaded with 25 parts of a 20 mass % solution of polyamic acid without silicone as binder component, and a mixture was obtained wherein the mass ratio of binder to activated carbon was 1:19. This mixture was applied to aluminum foil (thickness of 0.1 mm), and heat treatment was performed at 150° C. for 30 minutes, and. then 350° C. for 1 hour, to manufacture a test piece. Using the obtained test piece, the properties were evaluated as in Example 1.

Comparative Example 3

95 parts of activated carbon powder (specific surface area of 1700 $m^2/g$, average particle size of 10 μm) was kneaded with 20 parts of a 25 mass % solution of the polyamic acid obtained in Synthesis Example 4 as binder component, and a mixture was thereby obtained wherein the mass ratio of polyamic acid to activated carbon was 1:19. This mixture was applied to an etched aluminum foil (thickness of 0.1 mm) and heat treatment was performed at 150° C. for 30 minutes followed by 300° C. for 1 hour to thermoset the mixture and make it adhere firmly to the aluminum foil collector so as to manufacture a test piece. Using the obtained test piece, the properties were evaluated as in Example 1.

Comparative Example 4

5 parts of the polyimide silicone resin (V) obtained in Synthesis Example 5 and 0.6 parts of the epoxy compound GGA were uniformly dissolved in 30 parts cyclohexane to obtain a binder component. 111.4 parts activated carbon powder (specific surface area of 1700m²/g, average particle size of 10 μm) was kneaded with this binder, and a mixture was thus obtained wherein the mass ratio of binder to activated carbon was 1:19. This mixture was applied to aluminum foil (thickness of 0.1 mm), and heat treatment, was performed at 105° C. for 30 minutes followed by 150° C. for 1 hour to thermoset the mixture and stick it to the aluminum foil so as to obtain a test piece. Using the obtained test piece, the properties were evaluated as in Example 1.

The components of the electrodes of the Examples and Comparative Examples are shown in TABLE 1, and the test results are shown in TABLE 2, respectively.

TABLE 1

|  | Resin | Effective ingredient (parts) | Epoxy compound (parts) | Activated carbon (parts) |
|---|---|---|---|---|
| Ex. 1 | I | 5 | — | 95 |
| Ex. 2 | II | 5 | — | 95 |
| Ex. 3 | III | 5 | — | 95 |
| Comp. Ex. 1 | PTFE | 5 | — | 95 |
| Comp. Ex. 2 | PI | 5 | — | 95 |
| Comp. Ex. 3 | IV | 5 | — | 95 |
| Comp. Ex. 4 | V | 5 | GGA (0.6) | 111.4 |

PTFE: Polytetrafluoroethylene
PI: Polyimide resin

TABLE 2

| | Bending compliance | | | Discharge capacity (F/g) | | Internal resistance (Ω) | |
|---|---|---|---|---|---|---|---|
| | adhesion | | | | | | |
| | Initial | 240° C./ 240 hr | Electrolyte resistance | Initial | After 500 cycles | Initial | After 500 cycles |
| Ex. 1 | ○ | ○ | 0.1%> | 22.5 | 21.4 | 3.2 | 3.4 |
| Ex. 2 | ○ | ○ | 0.1%> | 23.2 | 22.0 | 3.6 | 3.9 |
| Ex. 3 | ○ | ○ | 0.1%> | 22.8 | 21.5 | 3.5 | 4.0 |
| Comp. Ex. 1 | X | X | 0.1%> | 21.3 | 11.2 | 4.2 | 7.8 |
| Comp. Ex. 2 | X | X | 0.1%> | 22.0 | 16.4 | 3.9 | 6.7 |
| Comp. Ex. 3 | X | X | 0.1%> | 18.5 | 13.7 | 3.8 | 6.8 |
| Comp. Ex. 4 | ○ | ○ | 5.8% | 17.3 | 9.6 | 3.9 | 7.2 |

○: No peeling of film or cracks
X: Peeling of film or cracks

The following two points were ascertained from the results shown in TABLE 2.

(1) Since, for the test pieces in the Examples, there was no peeling from the aluminum foil film or cracks in the film in any of the cases, the electrochemical capacitor electrode of the present invention has good heat resistant adhesion. Also, regarding electrolyte resistance, there is no increase due to solvent impregnation, and electrolyte resistance is good.

(2) Since the electrochemical capacitor using the electrode of the present invention has high capacity, and decrease of capacity and increase of internal resistance after 500 cycles of use are both small, it has high stability.

INDUSTRIAL APPLICABILITY

The electrode for an electrochemical capacitor of the invention has superior heat-resistance and electrolyte resistance, as well as good adhesion to the collector, and since the electrochemical capacitor of the invention using this electrode has high capacity and superior stability, it has great value as a component in electric products.

What is claimed is:

1. An electrode for an electrochemical capacitor comprising an electrode, a collector, an electrolyte solution and a separator, wherein said electrode contains at least a conductive material and a polyimide silicone of formula (1) having an average molecular weight of 5,000-150,000:

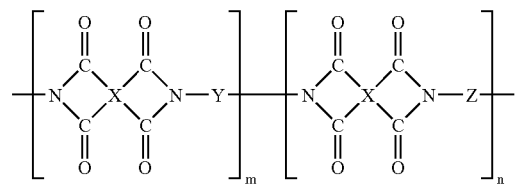

(1)

wherein,

X is at least one moiety of a tetravalent organic group of formula (2), (3), (4), (5), (6) or (7), Y is an organic group having an ether linkage of formula (8) or (9), and Z is a siloxane diamine residue of formula (15), wherein the proportion of the siloxane diamine residue of formula (15) in the polyimide silicone of formula (1) is 10 mass % or less,

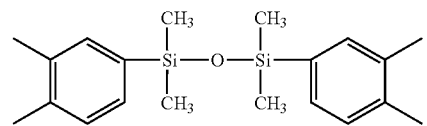

(2)

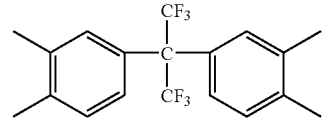

(3)

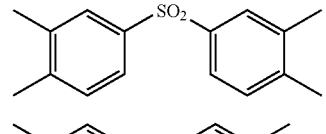

(4)

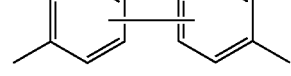

(5)

-continued

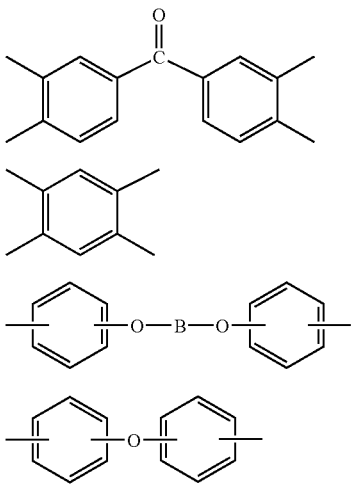

wherein,
B in formula(8) is a divalent organic group of formula (10), (11), (12), (13) or (14),

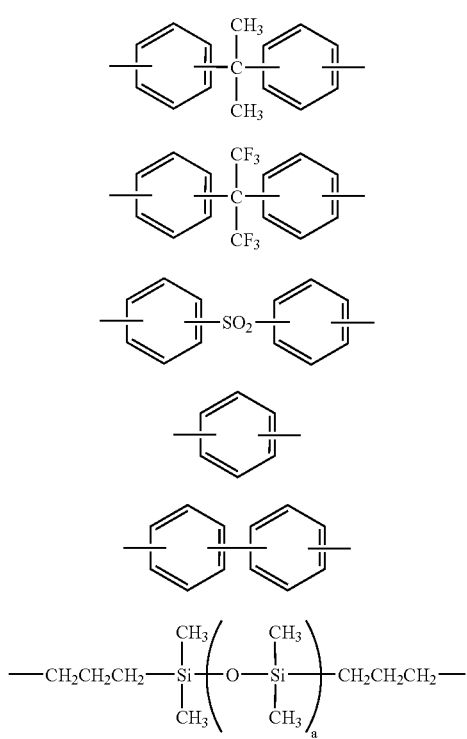

wherein,
a in formula (15) is an integer of 1-20; and
m, n in formula (1) are numbers satisfying the relations $0.8 \leq m/(m+n) \leq 0.99$ and $0.01 \leq n/(m+n) \leq 0.2$.

2. The electrode for an electrochemical capacitor according to claim 1, wherein said conductive material is a carbon material and/or a transition metal composite oxide.

3. The electrode for an electrochemical capacitor according to claim 1, wherein the mass ratio of said conductive material and said polyimide silicone is 99:1-80:20.

4. An electrochemical capacitor, wherein said electrochemical capacitor comprises an electrode, a collector, an electrolyte solution and a separator, and said electrode is the electrode according to claim 1.

5. The electrode for an electrochemical capacitor according to claim 1, wherein X is only one moiety of a tetravalent organic group of formula (2), (3), (4), (5), (6) or (7).

6. The electrode for an electrochemical capacitor according to claim 1, wherein X is two or more moieties of a tetravalent organic group of formula (2), (3), (4), (5), (6) or (7).

7. The electrode for an electrochemical capacitor according to claim 1, wherein Y is only one moiety of an organic group having an ether linkage of formula (8) or (9).

8. The electrode for an electrochemical capacitor according to claim 1, wherein Y is two or more moieties of an organic group having an ether linkage of formula (8) or (9).

9. The electrode for an electrochemical capacitor according to claim 1, wherein B is only one moiety of a divalent organic group of formula (10), (11), (12), (13) or (14).

10. The electrode for an electrochemical capacitor according to claim 1, wherein B is two or more moieties of a divalent organic group of formula (10), (11), (12), (13) or (14).

11. The electrode for an electrochemical capacitor according to claim 1, wherein a is an integer of 1-10.

12. The electrode for an electrochemical capacitor according to claim 1, wherein m, n satisfy the relations $0.9 \leq m/(m+n) \leq 0.99$ and $0.01 \leq n/(m+n) \leq 0.1$.

13. The electrode for an electrochemical capacitor according to claim 1, wherein the mass ratio of said conductive material and said polyimide silicone is 99:1-85:15.

14. A composition used for an electrode for an electrochemical capacitor comprising an electrode, a collector, an electrolyte solution and a separator, wherein said composition is formed by mixing at least a conductive material and a polyamic acid of formula (16):

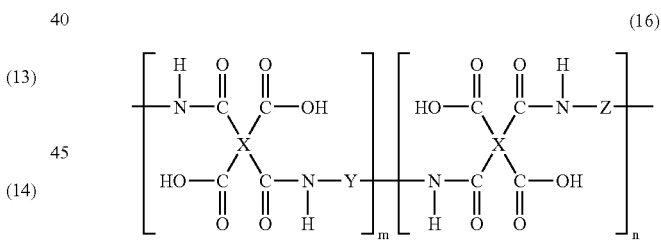

wherein,
X is at least one moiety of a tetravalent organic group of formula (2), (3), (4), (5), (6) or (7),
Y is an organic group having an ether linkage of formula (8) or (9), and
Z is a siloxane diamine residue of formula (15),
wherein the proportion of the siloxane diamine residue of formula (15) in the polyimide silicone of formula (16) is 10 mass % or less,

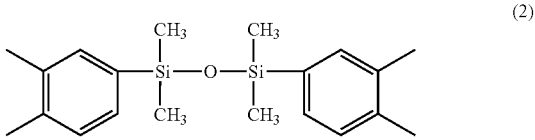

-continued

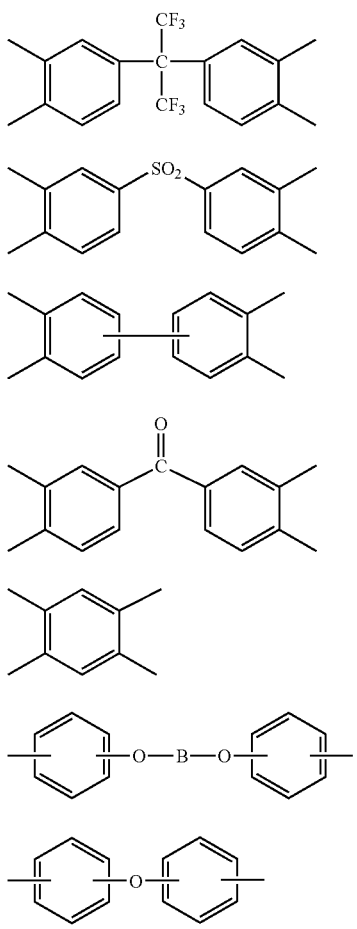

wherein,
B in formula (8) is a divalent organic group of formula (10), (11), (12), (13) or (14),

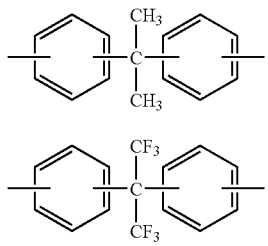

-continued

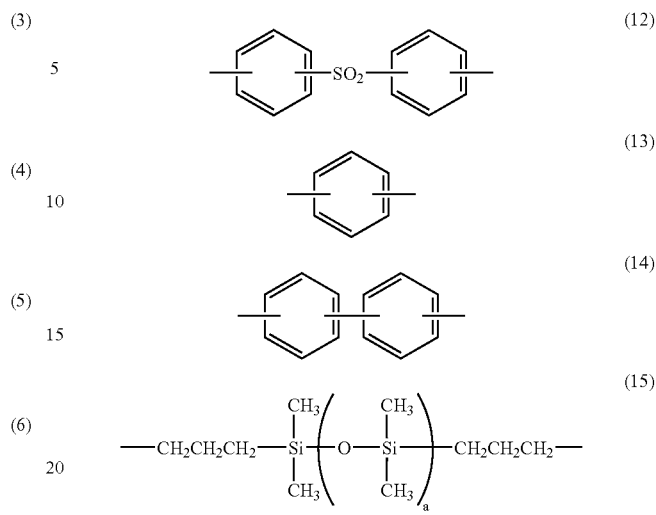

wherein,
a in formula (15) is an integer of 1-20; and
m, n in formula (16) are numbers satisfying the relations $0.8 \leq m/(m+n) \leq 0.99$ and $0.01 \leq n/(m+n) \leq 0.2$.

15. The composition for an electrochemical capacitor according to claim 14, wherein said conductive material is a carbon material and/or a transition metal composite oxide.

16. The composition for an electrochemical capacitor according to claim 14, wherein the mass ratio of said conductive material and said polyamic acid is 99:1-80:20.

17. A method of manufacturing an electrode for an electrochemical capacitor, comprising applying the composition used for the electrode for an electrochemical capacitor according to claim 14 to a collector surface, and a heat treatment for curing said polyamic acid so as to stick the electrode to the collector.

18. The method of manufacturing an electrode for an electrochemical capacitor according to claim 17, wherein the temperature of said heat treatment is 200° C.-600° C.

19. The method of manufacturing an electrode for an electrochemical capacitor according to claim 17, wherein the temperature of said heat treatment is 250° C.-500° C.

20. The composition for an electrochemical capacitor according to claim 14, wherein a is an integer of 1-10, and m, n satisfy the relations $0.9 \leq m/(m+n) \leq 0.99$ and $0.01 \leq n/(m+n) \leq 0.1$.

* * * * *